US006578357B1

(12) United States Patent
Schmollngruber

(10) Patent No.: US 6,578,357 B1
(45) Date of Patent: Jun. 17, 2003

(54) REGULATING DEVICE FOR HYDRAULIC WORKING TOOLS

(75) Inventor: Johann Schmollngruber, Grossraming (AT)

(73) Assignee: Weber-Hydraulik GmbH, Losenstein (AT)

( * ) Notice: Subject to any disclaimer, the term of this patent is extended or adjusted under 35 U.S.C. 154(b) by 0 days.

(21) Appl. No.: 09/719,195

(22) PCT Filed: Jun. 8, 1999

(86) PCT No.: PCT/AT99/00145

§ 371 (c)(1), (2), (4) Date: Feb. 7, 2001

(87) PCT Pub. No.: WO99/66212

PCT Pub. Date: Dec. 23, 1999

(30) Foreign Application Priority Data

Jun. 12, 1998 (AT) .......................................... 392/98 U

(51) Int. Cl.$^{7}$ .............................................. F16D 31/02
(52) U.S. Cl. ......................................... 60/421; 173/206
(58) Field of Search ................................ 173/206, 207, 173/218; 60/421

(56) References Cited

U.S. PATENT DOCUMENTS 2,309,983 A * 2/1943 Riddle .................... 100/258 A
2,767,550 A 10/1956 Lapsley
3,762,688 A 10/1973 Leonhardt
3,819,153 A 6/1974 Hurst et al.
4,255,091 A 3/1981 Dike, Jr.
4,378,675 A * 4/1983 Otto ...................... 137/565.33
4,392,263 A 7/1983 Amoroso
5,746,108 A * 5/1998 Kim ............................ 91/444
5,852,934 A * 12/1998 Chung et al. ................. 60/421
5,890,303 A * 4/1999 Ishikawa et al. .............. 37/348
6,164,069 A * 12/2000 Takahashi et al. ............ 60/421

FOREIGN PATENT DOCUMENTS

| | | |
|---|---|---|
| DE | 13 01 960 | 8/1969 |
| DE | 196 51 510 | 12/1998 |
| EP | 0 296 526 | 12/1988 |
| SU | 1838229 | 8/1993 |

OTHER PUBLICATIONS

Amkus Rescue Systems, ED2A–STD Power Unit, Sep. 5, 2002, http://www.amkus.com/html/ed2a–std.html.*
American Rescue Technology, MACH III Mini Simo, Sep. 5, 2002, http://www.art4rescue.com/mach_iii_mini_simo.htm.*
Holmatro Rescue Equipment, DPU Power Units, Aug. 29, 2002, http://www.holmatro–usa.com/product/pud.htm.*
Amkus B104–QL Power Unit, Sep. 5, 2002, http://www.wrfl.com/rescue/2984.htm.*

* cited by examiner

*Primary Examiner*—Stephen F. Gerrity
*Assistant Examiner*—Paul Durand
(74) *Attorney, Agent, or Firm*—Collard & Roe, PC

(57) ABSTRACT

The invention describes a control unit for at least two tools (2, 3) operated by a pressurized medium (6), in particular hydraulic oil (7), e.g. emergency cutters (4), emergency jacks (7), etc., a delivery circuit (10, 11) for the pressurized medium (6) being provided for each tool (2, 3) and at least one pressure generator (9). At least one control device (15) comprising a control valve (23, 24) is provided in each of the delivery circuits (10, 11) for the tools (2, 3) and the control valves (23, 24) are placed in a flow connection via at least one connecting passage (25) or a connecting line as required.

8 Claims, 6 Drawing Sheets

REGULATING DEVICE FOR HYDRAULIC WORKING TOOLS

CROSS REFERENCE TO RELATED APPLICATIONS

Applicants claim priority under 35 U.S.C. §119 of Austrian Application No. GM 392/98 filed Jun. 12, 1998. Applicants also claim priority under 35 U.S.C. §120 of PCT/AT99/00145 filed Jun. 8, 1999. The international application under PCT article 21(2) was not published in English.

The invention relates to a control device of the type outlined in the generic part of claim 24.

As a means of operating several tools driven by a pressurised medium. e.g. emergency cutter emergency jacks, etc., of the type used with mobile emergency and rescue equipment, hydraulic units are known which have multi-circuit pumps to supply several delivery circuits. Each tool is assigned its own delivery circuit and valves are fitted on every tool so that they can all be operated simultaneously or each individually. A device for combining fluid in construction site vehicles is known from DE 195 51 510 hereby compressed medium is uniformly applied to several actuators starting from two pumps delivering the pressurized medium via co-operating control valves and bypass lines, the intention being to improve the ability to control the working machinery. The disclosed device for combining the fluid is designed to activate four double-acting actuator units starting from two pumping units and, in the embodiment described, requires a large number of control and regulating valves and an extensive external run of lines.

Another device for regulating and activating two double-acting and one single-acting actuator starting from a pumping unit is known from U.S. Pat. No. 2,768,550 A. The objective of this invention is to provide a hydraulic system which can be supplied and controlled so as to generate different variables for several hydraulic actuator units in order to apply the compressed medium in different quantities. Again with this known device, a large number of control valves are needed in addition to bypass valves, which means that an extensive run of lines needs to be adapted to the respective configuration of the machinery, leading to a reduction in safety due installation and high costs.

Accordingly, the objective of the invention is to provide a control unit permitting optional operation of at least two work tools at the highest possible energy consumption.

This objective is achieved by the invention due to the characterising features set out in claim 24. The surprising advantage of this arrangement is that by providing a control device in the delivery circuits, a flow connection can be switched into operation as required, enabling a flow of medium to be built up in a pressure generator having a dual or multi-circuit pump and concentrated on one tool. Faster operating speeds can be achieved as a result, which shortens the usage time and significantly speeds up rescue operations. In addition, the weight of the delivery unit is of crucial importance in mobile applications and the design proposed by the invention offers a compact unit requiring few components. Since the delivery rate has a direct effect on the speed at which the tools can be operated and tools often have to be used in an alternating sequence, full use can be made of the available resources. The design proposed by the invention also eliminates connecting lines, enhancing operating safety by avoiding potential leakage and reducing assembly requirements.

In order to provide a clearer understanding, the invention will be described with reference to examples of embodiments illustrated in the appended drawings.

Of these:

Figure 1:
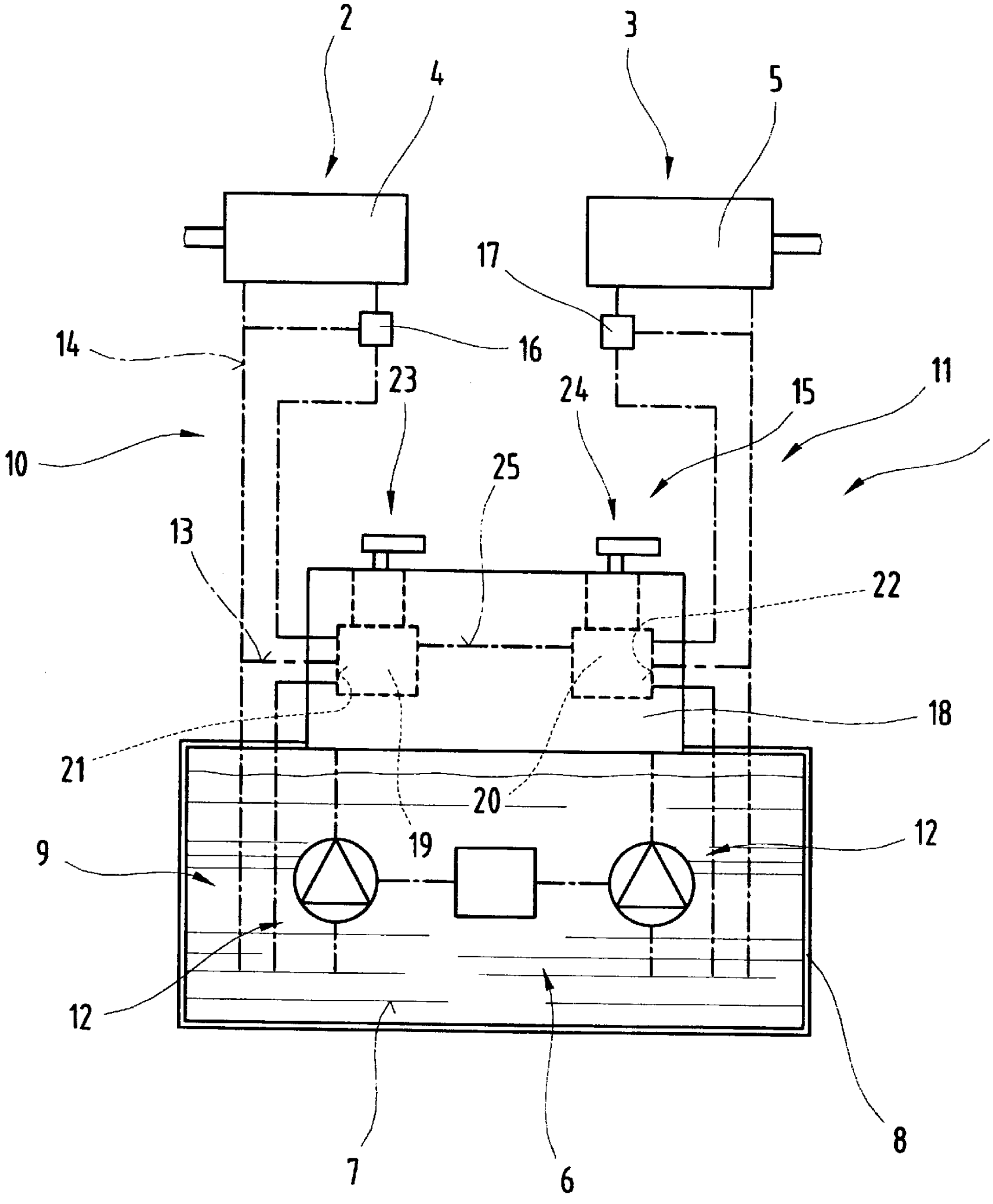
FIG. 1 is a simplified diagram of a control unit proposed by the invention for two delivery circuits with a hydraulic unit and work tools.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may also be construed as independent inventive solutions or solutions proposed by the invention in their own right.

FIG. 1 is a diagrammatic illustration of a hydraulic unit 1 for supplying at least two tools 2, 3, e.g. emergency cutters 4, emergency jacks 5, etc., with a pressurised medium 6, e.g. hydraulic oil 7. A pressure generator 9 is arranged in a storage container 8 for the hydraulic oil 7. The pressure generator 9 is preferably designed to form an independent delivery circuit 10, 11 for each tool 2, 3, each preferably being equipped with a dual or multi-circuit pump 12 having a common drive motor. In another preferred embodiment, designed to provide optimum delivery to the tools 2, 3, the pressure generator 9 or the dual or multi-circuit pump 12 is set up as a double-acting pressure pump with at least two stages, which means that piston pumps in particular will be suitable because they attain the high pressure specifically needed, whilst radial piston pumps are particularly well suited to mobile units because of the small dimensions and low weight which can be achieved.

The tool 2 and/or the tool 3 is connected via flow passages 13 and delivery lines 14 to the hydraulic unit 1, with a control device 15 connected in between. Each of the tools 2, 3 is also provided with an opening and closing valve 16, 17 so that they can be optionally placed in or out of service, even if using longer delivery lines 14, without having to operate the control device 15.

In the embodiment illustrated as an example here, the control device 15 is shown as a block-shaped valve housing 18, in which a valve body 19, 20 is arranged in each of the delivery circuits 10, 11, spaced at a distance apart, providing a flow connection into the flow passages 13. Seats 21, 22 arranged in the valve housing 18, together with the valve bodies 19, 20 mounted therein, provide control valves 23, 24 for the tools 2, 3, and are connected via connecting passages 25 in the valve housing 18 to provide a flow connection between the delivery circuits 10, 11 when the control valves 23, 24 are in the appropriate setting positions.

The control valves 23, 24 are preferably provided in the form of rotary disk valves, in which the valve bodies 19, 20 have a cylindrical cross section, allowing a requisite number of setting positions when pivoted.

To connect two tools 2, 3 to the hydraulic unit 1, as is the case with a preferred embodiment illustrated in FIG. 1, three setting positions per control valve 23, 24 will suffice for switching the control device 15 to different operating modes, whereby each of the tools 2, 3 is supplied by one of the independent delivery circuits 10, 11 when the control valves 23, 24 are in a first setting position, and the delivery output of the dual or multi-circuit pump 12 is concentrated via a connecting line 25 on one of the delivery circuits 10, 11 in order to supply only one of the tools 2, 3 in a second setting position, in order to produce higher operating speeds, whilst in a third setting position, pressurised medium 6 is prevented from being fed in the direction of the tools 2, 3 so that the pressurised medium delivered by the dual or multi-circuit pump 12 is returned via the control valves 23, 24 directly into the storage container 8.

Figure 2:
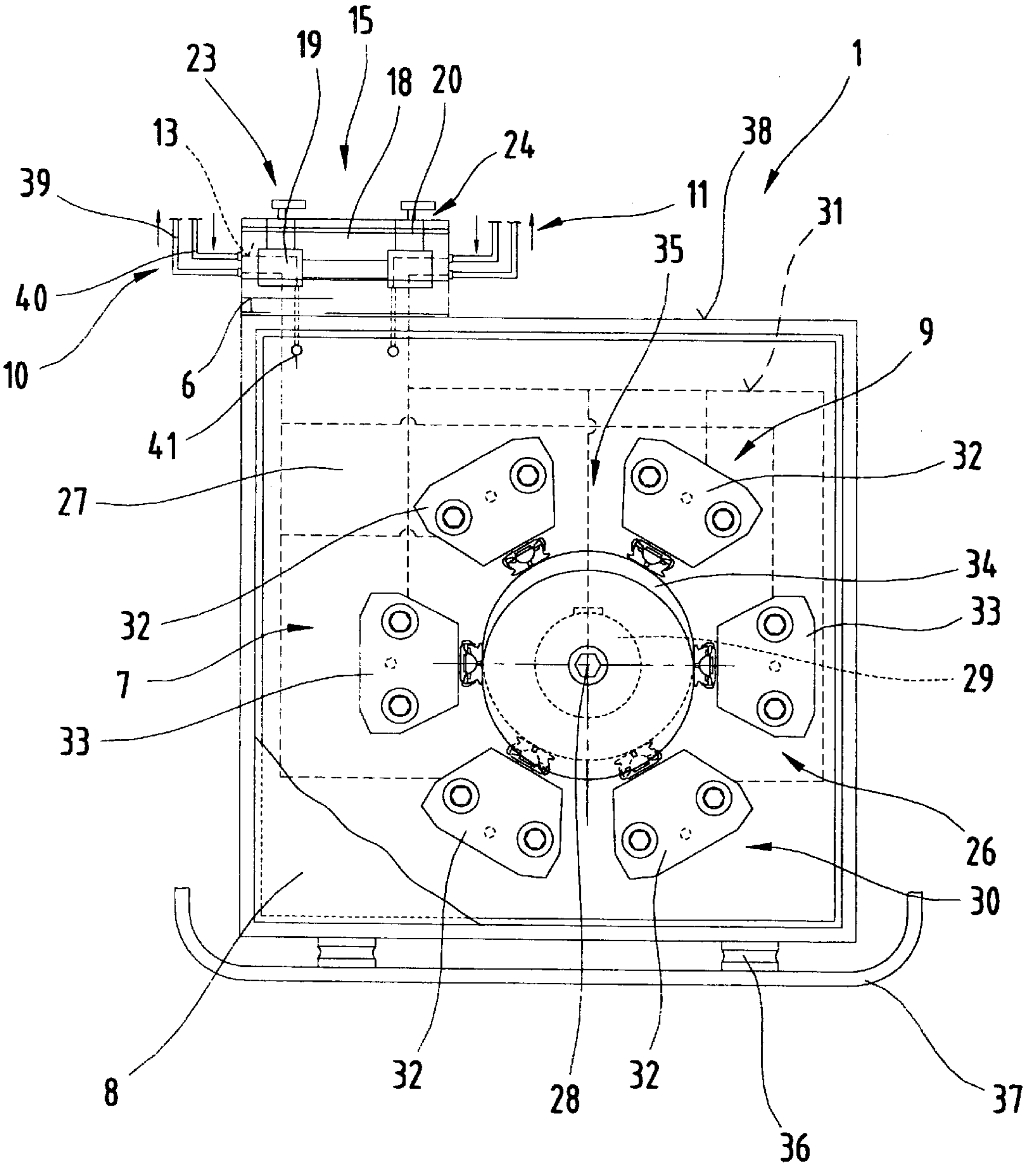
FIG. 2 is a detailed view of the pressure generator with the control unit proposed by the invention, seen from a front view and in partial section.

FIG. 2 illustrates the hydraulic unit 1 with the pressure generator 9 and the control device 15. In the embodiment illustrated, the pressure generator 9 is a dual-circuit radial piston pump 26 on a single- or multi-part housing component 27 of a plate design, with a drive shaft 28 of a drive motor 29, which flange-mounted on the housing component 27 for example, projecting through it and joined to the pumping units 30.

The pumping units 30 are standard delivery elements for the pressurised medium 6 and are of an automatic suction design. In the embodiment illustrated, six pumping units 30 are mounted on the housing component 27. Three of these respectively are connected to the delivery circuits 10, 11 via flow passages 31 extending in two planes through the housing component 27. In order to configure the pressure generator 9 in a multi-stage layout, each of the delivery circuits 10, 11 is supplied by means of two high-pressure elements 32 and a low pressure element 33.

An eccentric element 34, coupled so as to be joined in rotation with the drive shaft 28, is used to apply pressure to the pumping units 30 and can be displaced on the drive shaft 28 in an axial direction relative thereto so that the delivery output can be regulated between a zero value and a maximum value when the eccentricity changes as a result of such a displacement.

The pumping units 30 including the drive system 35 comprising drive shaft 28 and eccentric element 34 are surrounded by hydraulic oil 7, provided in the storage container 8, which is flange-mounted in a fluid-proof seal on the housing component 27 and has all the fixtures conventionally provided on a storage container 8 of this type such as filler plug, drainage pug and level indicator. The drive shaft 28 is mounted through the housing component 27 to provide a fluid-tight seal in a known manner.

The housing component 27 is mounted in a bearing frame 37 consisting of tubes with feet forming damping elements 36, for example.

The valve housing 18 of the control device 15 with the control valves 23, 24 is mounted on an end face 38 of the housing component 27 in a flow connection with the flow passages 31.

The tools, not illustrated in detail, are supplied by means of the delivery circuits 10 and 11, which are activated when the valve bodies 19, 20 are in the illustrated position, each of the delivery circuits 10, 11 having a pressure line 39 and a return line 40 provided as hydraulic hoses and joined to the valve housing 18 by screw fittings. In the position illustrated, the flow passages 13 in the valve housing 18 and the valve bodies 19, 20 allow the pressurised medium to flow from the pressure generator 9 to each of the delivery circuits 10, 11 independently and allow the pressurised medium 6 to be returned to the storage container 8 via flow passages 13 and outlet ports 41 in the housing component 27. When the control valves 23, 24 are in the position illustrated, the connecting line 14 is de-activated.

The system illustrated in FIG. 2 also incorporates known features used to set up a two-stage pressure system of this type, e.g. pressure-limiting valves, throttle valves, check valves, etc, which will not be described in any further detail.

Figure 3:
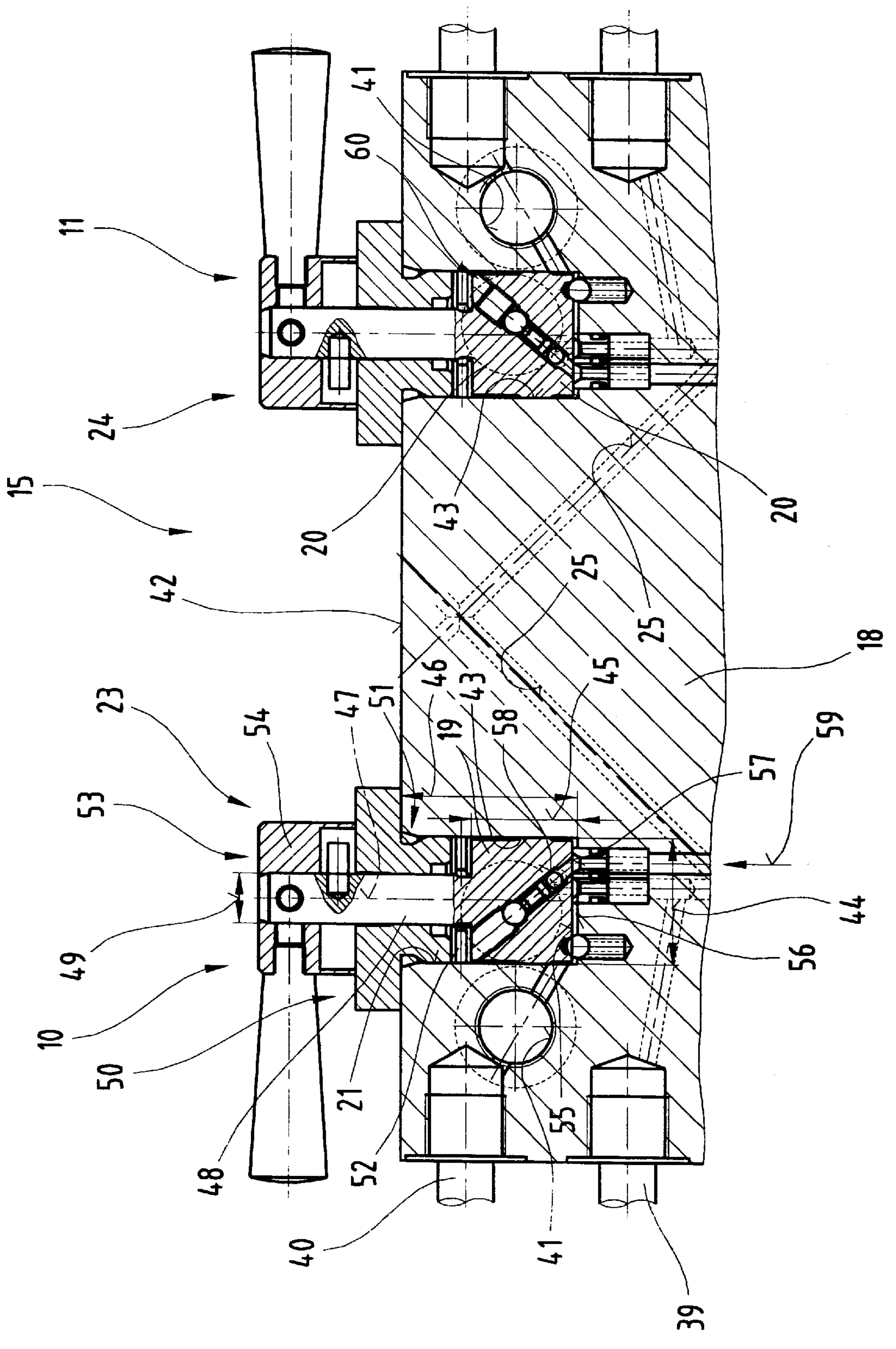
FIG. 3 is a cross section of the control unit comprising two control valves provided in the form of rotary disk valves fitted on connecting passages.

FIG. 3 illustrates the control device 15 with the control valves 23, 24. The control valve 23 is arranged in the delivery circuit 10 and the control valve 24 in the delivery circuit 11. The seats 21, 22 for the valve bodies 19, 20 are provided in the form of cylindrical bores 43 spaced at a distance apart from one another in an end face 42 of the valve housing 18. Since the control valves 23, 24 are identical in design, only control valve 23 will be described in detail although the various embodiments described equally apply to the other control valve 24. The valve body 19 of the control valve 23 is cylindrical in shape, having a diameter 44 adapted to the bore 43 so that the valve body 19 is able to pivot in the bore 43 without skewing. A height 45 of the valve body 19 is smaller than a depth 46 of the bore 43. A cylindrical projection 48 integral with the valve body 19 is provided, being coaxial with a median axis 47, having a diameter 49 which is about half that of the diameter 44. The projection 48 extends from the cylinder body 19 in the direction towards the end face 42 of the valve housing 18 and projects beyond it. An annular sealing member 50 with an annular flange is mounted on the end face 42 encasing the projection 48 and projecting into the seat 21. Seals 51 afford a tight seal between the sealing member 50 and the valve housing 18 as well as the sealing member 50 and the projection 48. In order to prevent friction—and hence improve the rotary performance of the sealing member 19—a thrust bearing 52 is provided encasing the projection 48 between opposite annular end faces of the sealing member 50 and the valve body 19. A lever-shaped handle 54 is joined to the projection 48 so as to be locked in rotation at an end region 53 projecting beyond the sealing member in order to pivot the valve body 19.

In the end face 56 of the valve body 19 remote from the projection 48 and facing a base surface 55 of the seat 21, bores 58 having inlet and outlet ports 57 are provided in the valve body 19. The flow passages 31 provided in the valve housing 18 co-operate with these inlet and outlet ports 57 depending on the position of the valve body 19. The pressurised medium 6 in the pressure line 39 is delivered from the pressure generator 9 in the direction of arrow 59 through the flow passages 31 and bores 58 and hence into the delivery circuit 10 and returned via the return line 40.

By means of a pre-settable setting position, the control valves 23, 24 can be placed in flow-connection with one another via the connecting passage 25, one of the delivery circuits 10, 11 optionally being shut off in this setting position so that the entire oil flow of the dual or multi-circuit pump 12 is delivered to one of the delivery circuits 10, 11 and hence tools 2, 3, so that the operating speed of the tool 2, 3 in which the pressure is concentrated is increased in proportion to the volume of pressurised medium 6 delivered.

In the position illustrated, both delivery circuits 10, 11 are activated independently of one another and the tools 2, 3 can be used independently.

In another setting position, not illustrated, the flow of medium arriving from the pressure generator 9 in the direction of the tools 10, 11 can be shut off, in which case it is returned via the bore 58 in the form of a short-circuit through the outlet ports 41.

When operating both delivery circuits 10, 11 independently in parallel, spring-biased check valves 60 inserted in the associated bores 58 in the valve bodies 19, 20 prevent a flow connection from being established between the control valves 23, 24.

Figure 4:
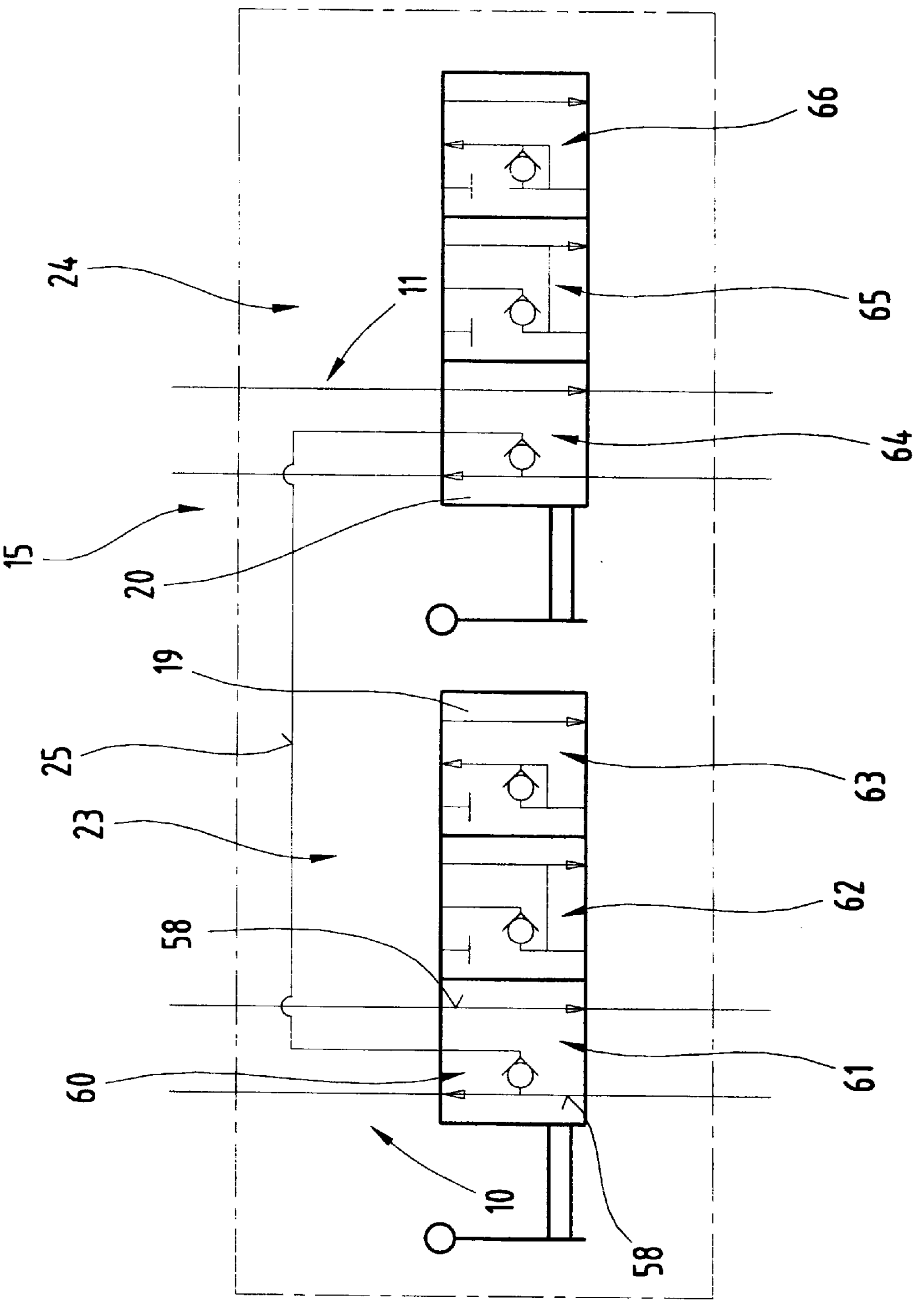
FIG. 4 shows the control unit proposed by the invention for two delivery circuits fitted with the control valves, illustrated as circuit symbols, for operating two delivery circuits independently.
Figure 5:
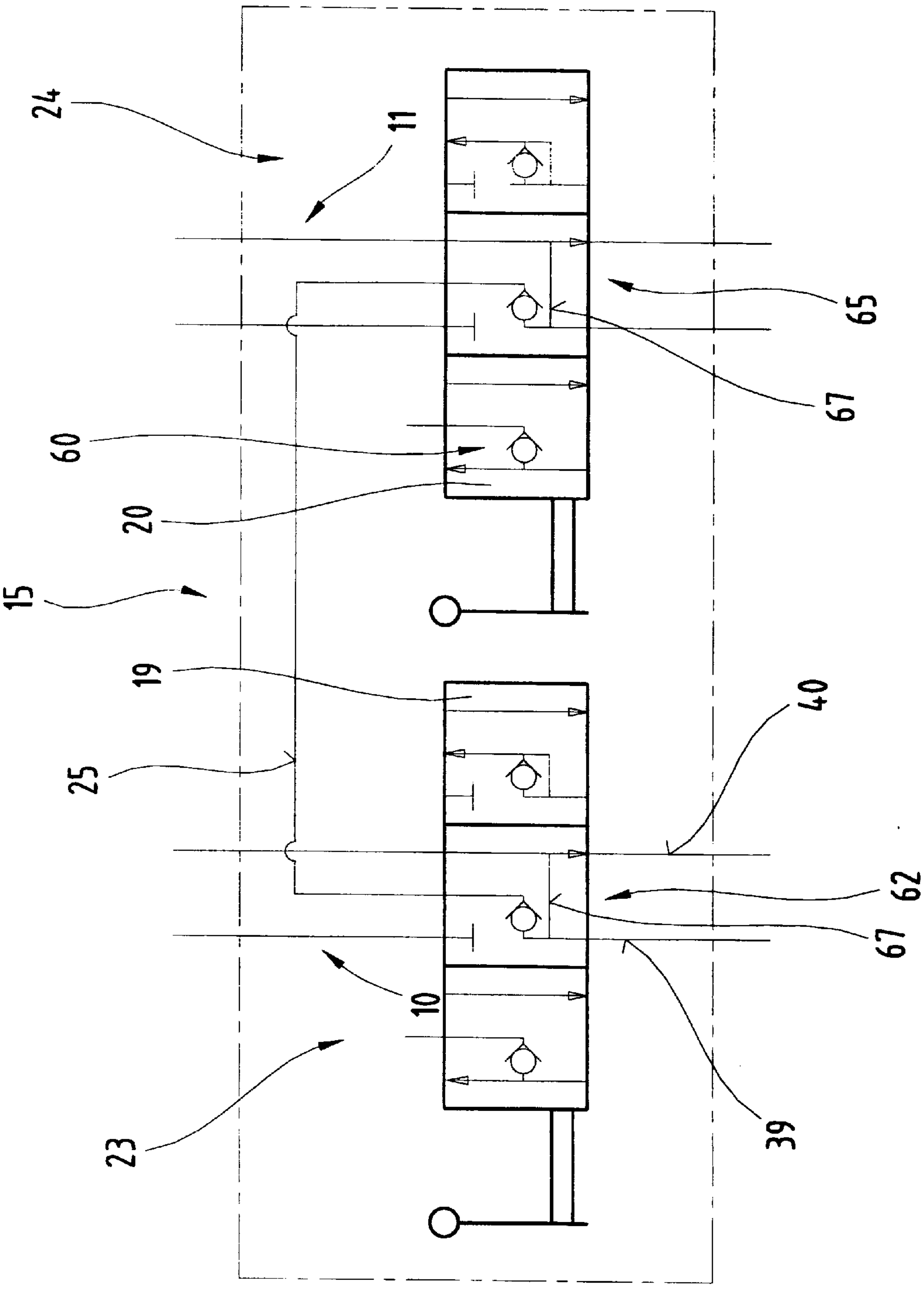
FIG. 5 shows the control unit proposed by the invention for two delivery circuits with the control valves, denoted by circuit symbols, in the shut-off position.
Figure 6:
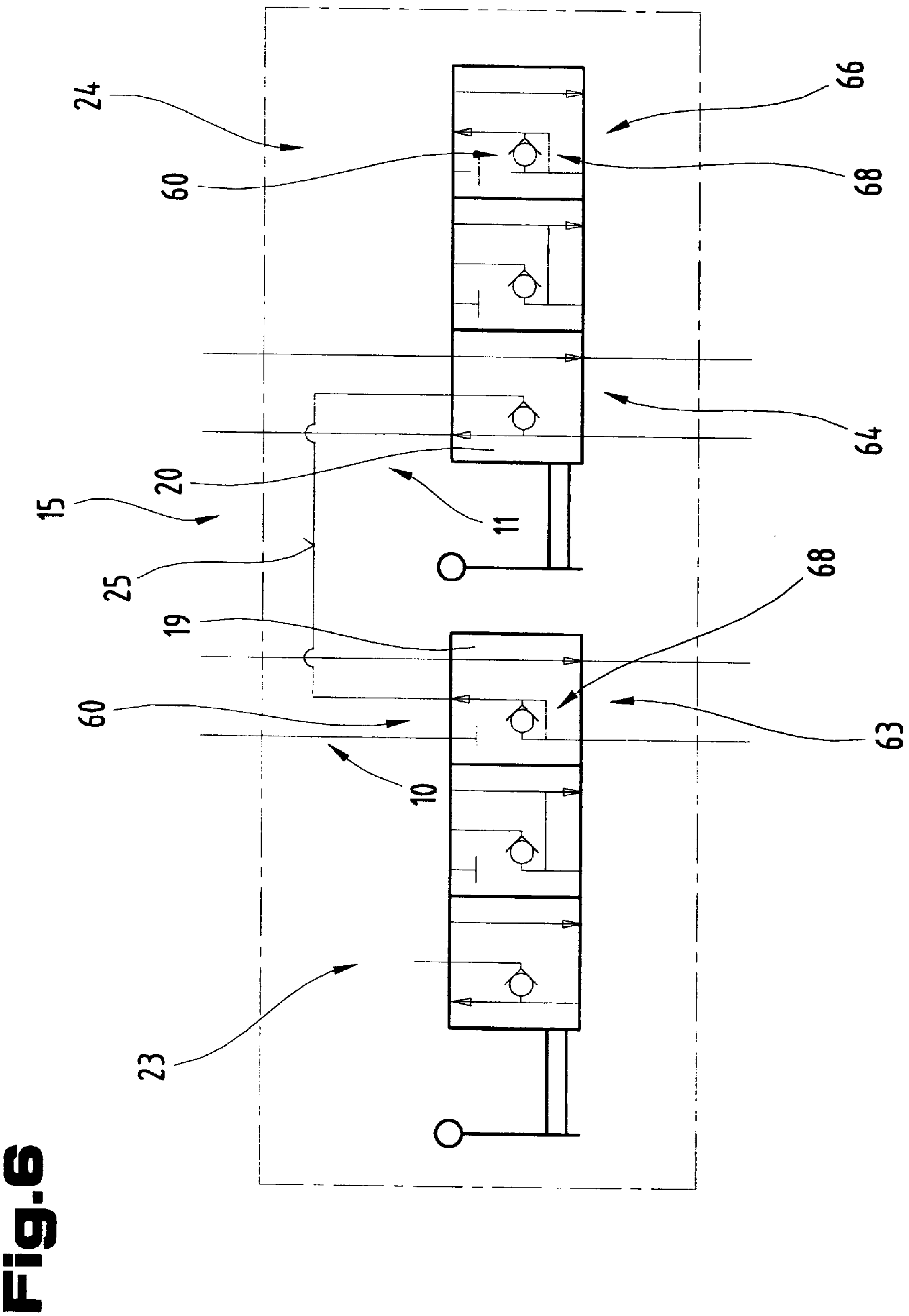
FIG. 6 illustrates the control unit proposed by the invention for two delivery circuits with the control valves, shown by circuit symbols, providing a flow connection between the delivery circuits in order to concentrate the delivered flow on one delivery circuit.

The control device 15 in FIGS. 4 to 6 consisting of the control valves 23, 24 for the different operating modes is illustrated by the standard symbols used in hydraulic drawings.

The bores 58 provided in the circular cross section of the valve bodies 19, 20 are illustrated showing the sequences of positions 61, 62, 63 for control valve 23 and positions 64, 65, 66 for control valve 24.

As may be seen from FIG. 4, when the control valve 23 is in position 61 and the control valve 24 is in position 64, the flow of medium delivered by the dual-circuit radial piston pump 26 is applied to the delivery circuits 10, 11 independently of one another, allowing a direct through-flow via the bores 58 of the valve body 19 on the pressure side and return side. The same effect prevails when the control valve 24 is in position 64. The connecting passage 25 branching off from and connecting the control valves 23, 24 is closed off by means of the check valve 60 provided in the valve bodies 19 and 20.

When the control valve 23 is in position 62 and the control valve 24 is in position 65 as illustrated in FIG. 5, the delivery circuits 10, 11 are shut off and the flow of medium flowing from the dual-circuit radial piston pump 26 into the valve bodies 19, 20 is directed via a short-circuit passage 67 connecting the pressure line 39 to the return line 40 in the valve bodies 19, 20 back into the storage container 8.

If the control valve 23 is shifted to setting position 63 as illustrated in FIG. 6 and the control valve 24 is in setting position 64 as described above with reference to FIG. 4, the flow of medium in the valve body 19 delivered by the dual-circuit radial piston pump 26 is fed via a bypass passage 68 on the return valve 60 around and through the connecting passage 25 to the control valve 24 and the flow of medium additionally flowing in the direction of the delivery circuit 11 is directed against the locking action of the check valve 60 in the valve body 20 to the tool. Accordingly, the entire volume delivered from the dual-circuit radial piston pump 26 flows through the delivery circuit 11, causing the operating speed of the tool to be increased.

However, the same effect will apply to delivery circuit 10 if the control valve 23 is switched to the position 61 described above with reference to FIG. 4 and the control valve 24 is in the setting position 66, in which case the bypass passage 68 for the check valve 60 provided in the valve body 20 also comes into action and the flow of medium delivered to the control valve 24 flows via the connecting passage 25 to the control valve 23 so that the entire flow is applied to the delivery circuit 10.

Instead of the control valves 23, 24 described here, provided in the form of rotary disk valves, it would of course be possible to use valve designs other than piston valves—in other words having linearly displaced control pistons. However, this type of design would make manufacture of the control piston of the valve housing and its sealing more complex and also implies a higher space requirement and weight.

The tools 2, 3 are also usually already fitted with integrated switch valves which fulfil an opening and closing function since these are generally connected to the hydraulic unit by longer hoses, so as to be able to switch the tools 2, 3 on and off wherever they are being operated.

Furthermore, instead of the manually operated embodiment, the control unit 15 could be fitted with remotely controllable actuators so that the control device 15 can be switched to the individual setting positions from any location.

For the sake of good order, it should finally be pointed out that in order to provide a clearer understanding of the structure of the control device 15, it and its constituent parts have been illustrated out of scale to a certain extent and/or on an enlarged and/or reduced scale.

The tasks underlying the independent inventive solutions can be found in the description.

Above all, subject matter of the individual embodiments illustrated in FIGS. 1, 2; 3; 4 to 6 can be construed as independent solutions proposed by the invention. The tasks and solutions can be found in the detailed descriptions relating to these drawings.

Reference Numbers

1 Hydraulic unit
2 Tool
3 Tool
4 Emergency cutters
5 Emergency jack
6 Pressurised medium
7 Hydraulic oil
8 Storage container
9 Pressure generator
10 Delivery circuit
11 Delivery circuit
12 Dual or multi-circuit pump
13 Flow passage
14 Delivery line
15 Control unit
16 Opening and closing valve
17 Opening and closing valve
18 Valve housing
19 Valve body
20 Valve body
21 Seat
22 Seat
23 Control valve
24 Control valve
25 Connecting passage
26 Dual-circuit radial piston pump
27 Housing component
28 Drive shaft
29 Drive motor
30 Pumping unit
31 Flow passage
32 High-pressure element
33 Low-pressure element
34 Eccentric element
35 Drive system
36 Damping element 37 Bearing frame
38 End face
39 Pressure line
40 Return line
41 Outlet port
42 End face
43 Bore
44 Diameter
45 Height
46 Depth
47 Median axis
48 Projection
49 Diameter
50 Sealing member
51 Seal
52 Axial bearing
53 End region
54 Handle
55 Base surface
56 End face
57 Inlet and outlet port
58 Bore
59 Arrow
60 Check valve
61 Position
62 Position
63 Position
64 Position
65 Position
66 Position
67 Short-circuit passage
68 Bypass passage

What is claimed is:

1. Control unit for at least two tools driven by a pressurized medium, comprising a delivery circuit for the pressurized medium for each tool and at least one pressure generator and a control device comprising control valves in the delivery circuits for the tools, the control valves being placed in a flow connection as required by at least one connecting passage, and in which two control valves are arranged in a common valve housing containing the connecting passage, characterized in that a control valve is provided for each delivery circuit for the tools, the control valve is provided as a rotary disk valve with a valve body of a substantially cylindrical shape, which is pivotally mounted in the valve housing provided with flow passages, the valve body is provided with at least one bore which provides a flow connection between inlet and outlet ports, and the inlet and outlet ports of the bore are arranged in an end face of the valve body, and each control valve has three setting positions, whereby when the control valves are in a first setting position each of the tools is supplied by one of the independent delivery circuits, and when one control valve is in a second setting position and the other control valve is in the first setting position, the flow of medium from the pressure generator via the connecting passage is fed from the control valve in the second setting position to the control valve in the first setting position so that the output delivered from the pressure generator can be concentrated on one tool, and when the control valves are in a third setting position, delivery is shut off.

2. Control unit as claimed in claim 1, characterized in that the control valve is provided as a piston valve.

3. Control unit as claimed in claim 1, characterized in that the valve housing of the control valves is mounted on an end face of a housing component bearing a drive motor and pumping elements.

4. Control unit for at least two tools driven by a pressurized medium, comprising a delivery circuit for the pressurized medium for each tool and at least one pressure generator and a control device comprising control valves in the delivery circuits for the tools, the control valves being placed in a flow connection as required by at least one connecting passage, and in which two control valves are arranged in a common valve housing containing the connecting passage, characterized in that a control valve is provided for each delivery circuit for the tools, the flow passages in the valve housing are arranged in at least two parallel planes extending parallel to a median axis of the valve body, and each control valve has three setting positions, whereby when the control valves are in a first setting position each of the tools is supplied by one of the independent delivery circuits, and when one control valve is in a second setting position and the other control valve is in the first setting position, the flow of medium from the pressure generator via the connecting passage is fed from the control valve in the second setting position to the control valve in the first setting position so that the output delivered from the pressure generator can be concentrated on one tool, and when the control valves are in a third setting position, delivery is shut off.

5. Control unit for at least two tools driven by a pressurized medium, comprising a delivery circuit for the pressurized medium for each tool and at least one pressure generator and a control device comprising control valves in the delivery circuits for the tools, the control valves being placed in a flow connection as required by at least one connecting passage, and in which two control valves are arranged in a common valve housing containing the connecting passage, characterized in that at a control valve is provided for each delivery circuit for the tools, the control valve is provided as a rotary disk valve with a valve body of a substantially cylindrical shape, which is pivotally mounted in the valve housing provided with flow passages, the valve body is provided with at least one bore which provides a flow connection between inlet and outlet ports, spring-biased check valves are disposed in the bores between the inlet and outlet ports, and each control valve has three setting positions, whereby when the control valves are in a first setting position each of the tools is supplied by one of the independent delivery circuits, and when one control valve is in a second setting position and the other control valve is in the first setting position, the flow of medium from the pressure generator via the connecting passage is fed from the control valve in the second setting position to the control valve in the first setting position so that the output delivered from the pressure generator can be concentrated on one tool, and when the control valves are in a third setting position, delivery is shut off.

6. Control unit as claimed in claim 5, characterized in that the connecting passage of the valve body sets up a flow connection as required in a co-operation with bores extending in the valve housing forming two inlets and two outlets when the control valves are in the second setting position.

7. Control unit for at least two tools driven by a pressurized medium, comprising a delivery circuit for the pressurized medium for each tool and at least one pressure generator and a control device comprising control valves in the delivery circuits for the tools, the control valves being placed in a flow connection as required by at least one connecting passage, and in which two control valves are arranged in a common valve housing containing the connecting passage, characterized in that at a control valve is provided for each delivery circuit for the tools, a respective outlet port of the control valve forms a flow connection via the connecting passage in the valve housing with a respective outlet for each delivery circuit, and each control valve has three setting positions, whereby when the control valves are in a first setting position each of the tools is supplied by one of the independent delivery circuits, and when one control valve is in a second setting position and the other control valve is in the first setting position, the flow of medium from the pressure generator via the connecting passage is fed from the control valve in the second setting position to the control valve in the first setting position so that the output delivered from the pressure generator can be concentrated on one tool, and when the control valves are in a third setting position, delivery is shut off.

8. Control unit for at least two tools driven by a pressurized medium, comprising a delivery circuit for the pressurized medium for each tool and at least one pressure generator and a control device comprising control valves in the delivery circuits for the tools, the control valves being placed in a flow connection as required by at least one connecting passage, and in which two control valves are arranged in a common valve housing containing the connecting passage, characterized in that at a control valve is provided for each delivery circuit for the tools, the valve housing is mounted on a housing component of the pressure generator and forms a flow connection with flow passages extending in a housing component of the pressure generator, and each control valve has three setting positions, whereby when the control valves are in a first setting position each of the tools is supplied by one of the independent delivery circuits, and when one control valve is in a second setting position and the other control valve is in the first setting position, the flow of medium from the pressure generator via the connecting passage is fed from the control valve in the second setting position to the control valve in the first setting position so that the output delivered from the pressure generator can be concentrated on one tool, and when the control valves are in a third setting position, delivery is shut off.

* * * * *